United States Patent Office 3,499,021
Patented Mar. 3, 1970

3,499,021
TOLUENE DIISOCYANATE PROCESS
Ehrenfried H. Kober, Hamden, and Wilhelm J. Schnabel, Branford, Conn., assignors to Olin Mathieson Chemical Corporation, a corporation of Virginia
No Drawing. Filed Oct. 19, 1966, Ser. No. 587,697
Int. Cl. C07c *119/04, 127/12, 127/24*
U.S. Cl. 260—453
4 Claims

ABSTRACT OF THE DISCLOSURE

A process for preparing toluene diisocyanate which comprises phosgenating the distillation residue obtained by phosgenating toluene diamine in the presence of an inert organic solvent.

---

This invention relates to an improved process for the preparation of toluene diisocyanate.

Toluene diisocyanate is a commercially available material particularly useful in the preparation of polyurethane foams. Although toluene diisocyanate can be prepared by a variety of methods, commercial processes prefer phosgenation of toluene diamines as a practical route to the corresponding diisocyanates. Thus, a mixture of toluene diamines is dissolved in an inert solvent and reacted with phosgene at elevated temperatures to provide the desired diisocyanates. The resulting reaction mixture is then purged to remove excess phosgene and gaseous by-products prior to recovering the toluene diisocyanates by distillation.

While providing the desired toluene diisocyanates, the previously described process is unsatisfactory in that substantial amounts of undesirable by-products containing nitrogen-carbon bonds are produced in the reaction, thereby decreasing the diisocyanate yield. Although the composition of the by-products cannot be determined with certainty, it is known that various ureas and biurets are always present in the distillation residue due to reaction of the isocyanate with the starting amine, and carbodiimides and isocyanurates are usually formed in the process.

The problem of low yields in the aforementioned process has been recognized in the literature. Thus, it has been proposed to carry out the phosgenation reaction in a series of vessels, each having a higher temperature than the preceding one, and employing a cascade system for transporting the amine solution from one vessel to the next. It is apparent that this method would be cumbersome in a commercial operation. A two-step process in which the amine is first reacted with hydrogen chloride to form the amine hydrochloride and thereafter phosgenated in the presence of a solvent to provide the isocyanate has also been described. However, excessive quantities of solvent are necessary in this process to disperse the crystalline hydrochloride, making the process unattractive from an economic viewpoint.

U.S. Patent 2,680,128, issued June 1, 1954, titled "Method of Producing Organic Diisocyanates," teaches that diisocyanate yields are improved by adding a high-boiling plasticizer, namely a polycyclic aromatic hydrocarbon, a hydrogenated polycyclic aromatic hydrocarbon, or a chlorinated aromatic hydrocarbon to the reaction mixture containing the diisocyanate and then fractionally distilling to recover the desired diisocyanate. This process requires the addition of a separate and costly reagent and does not lend itself to a satisfactory continuous operation.

The principal object of this invention is to provide an improved process for the preparation of toluene diisocyanate. Another object is to increase the yield of toluene diisocyanate obtained in a continuous operation. Still another object is to decrease the amount of undesirable by-products formed in the preparation of toluene diisocyanate from toluene diamine and phosgene.

These objects have been accomplished in accordance with the process of this invention wherein it has been found that phosgenation of the aforementioned distillation residue significantly improves the yield of toluene diisocyanate while reducing the amount of undesirable residue formed in the process.

Any conventional process for preparing toluene diisocyanate from the previously-described reactants such as the one described in U.S. Patent 2,822,373, issued Feb. 4, 1958, and titled "Process for the Manufacture of Organic Isocyanates," is susceptible of improvement by the process of this invention. A tan residue is generally obtained after removal of substantial amounts of the solvent and distillation of the toluene diisocyanate in the known processes. This residue usually contains trapped toluene diisocyanate together with polymeric materials such as isocyanates and high boiling impurities such as polyureas and biurets, and generally has a total isocyanate group content of about 15 to about 30 percent by weight. In conventional processes, this distillation residue decreases the yield of desired toluene diisocyanate and hinders continuous operations by accumulating in the equipment thereby necessitating periodic shut-downs to facilitate cleaning operations.

The surprising and unexpected discovery of this invention is particularly suited to a continuous process. Thus, the distillation residue is recycled to the synthesis reactor and phosgenated together with toluene diamine in the presence of the previously-described reaction mixture. A portion of the distillation residue is withdrawn occasionally from the recycle line in order to preclude build-up of undesirable by-products in the equipment. Preferably, this residue is phosgenated and treated in accordance with the previously-described procedure to insure maximum recovery of toluene diisocyanate therefrom. In another embodiment of the process of this invention, the residue is fed to a separate reactor where it is phosgenated and then to a purge column for degassing together with fresh reaction mixture.

While phosgenation of both the toluene diamine and the distillation residue will proceed at a temperature between about 100° and 250° C., a temperature between about 120° and 180° C. is preferred. The process is generally carried out at atmospheric pressure, although elevated pressures can be utilized.

Any of the inert solvents generally employed in the phosgenation of toluene diamine can be employed in phosgenating the residue. Illustrative of these solvents are chlorinated aromatic hydrocarbons such as monochlorobenzene, o-dichlorobenzene, p-dichlorobenzene, the trichlorinated benzenes, the chlorinated toluenes and xylenes, the chloroethylbenzenes, monochlorobiphenyl, and α- and β-naphthyl chloride. Other suitable solvents include ketones, such as phenyl ethyl ketone; ethers, for example, diphenyl ether; and esters, such as butyl acetate and amyl acetate. Tetrahydronaphthalene, cyclohexane, kerosene, carbon tetrachloride, trichloroethylene, and the like further illustrate the solvents that can be used in this process. Mixtures of the above solvents can also be conveniently employed.

The process of this invention is characterized by significantly improved yields and adaptability to an economic continuous operation.

The following examples will serve to illustrate the improved toluene diisocyanate process of this invention.

EXAMPLE 1

Toluene diamine comprising about 80 percent 2,4-toluene diamine and 20 percent of the 2,6-isomer was dissolved in o-dichlorobenzene and charged to a reactor. After continuous phosgenation at 125–130° C. for about 2.5 hours, this first reaction mixture was fed to a purge column. The excess phosgene and hydrogen chloride by-product were purged with nitrogen and the o-dichlorobenzene solvent removed by distillation. The bottoms from the purge column were fed to an evaporator stripper and a substantial amount of toluene diisocyanate, comprising a mixture of the 2,4- and 2,6-isomers, was removed by distillation.

A 100 gram portion of the distillation residue was withdrawn from the bottom of the evaporator stripper and a sample thereof analyzed for isocyanate content. Titration with dibutyl amine revealed that the 100 gram portion had an isocyanate group content of 21.46 grams. The one hundred grams of distillation residue were dissolved in 1000 ml. of o-dichlorobenzene and distilled to provide 30.0 grams of toluene diisocyanate and 70.0 grams of residue.

A second 100 gram portion of the distillation residue was withdrawn from the bottom of the evaporator stripper, dissolved in 1000 ml. of o-dichlorobenzene, and phosgenated at 150° C. for 3 hours in a fully baffled stirred reactor. After purging with nitrogen and removal of the solvent by distillation, 101.1 grams of crude product were obtained. Analysis of the product revealed that it has an isocyanate group content of 31.15 grams, and distillation provided 44.5 grams of toluene diisocyanate, leaving 56.6 grams of residue.

Comparison of the data determined before and after phosgenation revealed a 14.5 percent increase in the yield of distillable toluene diisocyanate and a 13.4 percent decrease in the amount of undistillable residue after phosgenation of the distillation residue from the evaporator stripper.

EXAMPLE 2

A distillation residue, obtained according to the procedure described in Example 1 by phosgenating toluene diamine to form a reaction mixture, purging, and removing solvent and toluene diisocyanate by distillation, was recycled to the synthesis reactor and phosgenated together with toluene diamine in the presence of fresh reaction mixture. Comparison of the yields of toluene diisocyanate obtained after equilibrium was reached with the conventional process where the distillation residue is discarded revealed that an approximate 15 percent decrease in undistillable residue and a corresponding increase in toluene diisocyanate yield was achieved by recycling the distillation residue.

What is claimed is:

1. In a process for preparing 2,4- and 2,6-toluene diisocyanate which comprises phosgenating 2,4- and 2,6-toluene diamine in the presence of an inert organic solvent at a temperature between about 100° and 250° C., thereby forming a first reaction mixture, degassing the reaction mixture, removing substantially all the solvent, and distilling 2,4- and 2,6-toluene diisocyanate from the reaction mixture, leaving behind a distillation residue, the improvement which comprises:
    (a) recycling the distillation residue to the first reaction mixture; and
    (b) phosgenating the distillation residue in the presence of the first reaction mixture and 2,4- and 2,6-toluene diamine, thereby increasing the overall yield of 2,4- and 2,6-toluene diisocyanate and decreasing the amount of undesirable by-products formed in the process.

2. The process of claim 1 wherein the phosgenation is carried out at a temperature between about 120° and 180° C.

3. The process of claim 1 wherein a portion of the distillation residue is withdrawn prior to the recycle step.

4. The process of claim 3 wherein the portion of the distillation residue that has been withdrawn is phosgenated in the presence of an inert organic solvent at a temperature between about 100° and 250° C., degassed and distilled, thereby insuring maximum recovery of 2,4- and 2,6-toluene diisocyanate from said portion.

References Cited
UNITED STATES PATENTS

| | | | |
|---|---|---|---|
| 3,184,493 | 5/1965 | Kunze et al. | 260—453 |
| 3,282,975 | 11/1966 | Friedman et al. | 260—453 |

CHARLES B. PARKER, Primary Examiner

D. H. TORRENCE, Assistant Examiner

U.S. Cl. X.R.

260—2.5, 553